(12) United States Patent
Ritter

(10) Patent No.: US 11,843,879 B2
(45) Date of Patent: Dec. 12, 2023

(54) SYSTEMS, DEVICES, AND METHODS FOR PIXEL FREQUENCY FILTERING FOR AN EVENT CAMERA

(71) Applicant: Raytheon BBN Technologies, Corp., Cambridge, MA (US)

(72) Inventor: Scott Ritter, Sudbury, MA (US)

(73) Assignee: Raytheon BBN Technologies, Corp., Cambridge, MA (US)

( * ) Notice: Subject to any disclaimer, the term of this patent is extended or adjusted under 35 U.S.C. 154(b) by 0 days.

(21) Appl. No.: 17/552,201

(22) Filed: Dec. 15, 2021

(65) Prior Publication Data

US 2022/0191413 A1 Jun. 16, 2022

Related U.S. Application Data

(60) Provisional application No. 63/125,928, filed on Dec. 15, 2020.

(51) Int. Cl.
| H04N 25/71 | (2023.01) |
| H04N 25/40 | (2023.01) |
| H04N 25/57 | (2023.01) |
| H04N 25/44 | (2023.01) |

(52) U.S. Cl.
CPC ............ *H04N 25/57* (2023.01); *H04N 25/44* (2023.01); *H04N 25/745* (2023.01)

(58) Field of Classification Search
CPC ...... H04N 5/355; H04N 5/345; H04N 5/3765; H04N 5/341
See application file for complete search history.

(56) References Cited

U.S. PATENT DOCUMENTS

2014/0363049 A1* 12/2014 Benosman ............. G06T 7/269
                                                              382/103
2019/0197715 A1*  6/2019 Rebecq ................ H04N 13/271

* cited by examiner

*Primary Examiner* — Ahmed A Berhan

(57) ABSTRACT

A technology is described for pixel frequency filtering for event cameras. An example of the technology can include receiving events representative of changes in brightness detected by a pixel in a pixel array included in the event camera, tracking a number of event sign transitions that occur within a defined time window, determining that the number of event transitions corresponds to an event transition frequency, and allowing the events generated by the pixel to be output from the event camera.

20 Claims, 6 Drawing Sheets

SYSTEMS, DEVICES, AND METHODS FOR PIXEL FREQUENCY FILTERING FOR AN EVENT CAMERA

RELATED APPLICATIONS

This application claims the benefit of U.S. Provisional Patent Application Ser. No. 63/125,928, filed Dec. 15, 2020, entitled, "Pixel Frequency Discriminator for Event-Based Camera", which is incorporated by reference in its entirety herein.

BACKGROUND

An event camera is an imaging sensor that responds to local changes in brightness. Event cameras do not capture images using a shutter as conventional cameras do. Instead, each pixel in an array of pixels operates independently and asynchronously, reporting changes in brightness as the changes occur, and remaining inactive otherwise. More specifically, pixels in event cameras independently respond to changes in brightness, where each pixel stores a brightness reference level and continuously compares the brightness reference to the current level of brightness. If the difference in brightness exceeds a preset threshold, the pixel resets its brightness reference level and generates an event. The event is a discrete packet of information containing the pixel address and timestamp, and the polarity (increase or decrease) of the brightness change. The events generated by the pixels of the event camera are output as an asynchronous stream of events triggered by changes in scene illumination.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
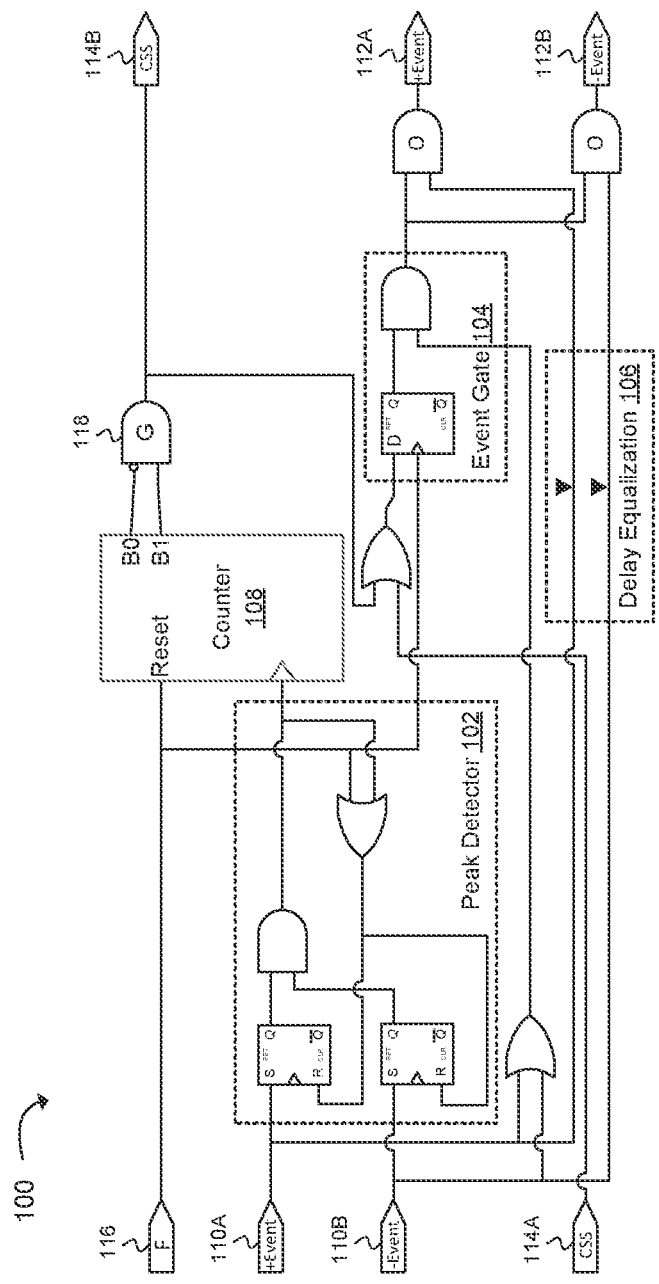
FIG. 1 is a circuit diagram illustrating an event filter device for event cameras, in accordance with an example of the technology.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology, nor is it intended to limit the scope of the claimed subject matter.

Technologies are described for pixel frequency filtering for an event camera. Event cameras are a class of camera that captures changing scenes pixel by pixel, rather than by capturing an entire frame at once, as typical cameras do. For an event camera, whenever an individual pixel increases or decreases in brightness by a certain amount, the event camera outputs an event, which can be a small piece of data that includes the identity of the pixel (e.g., X-Y coordinates on the camera sensor), the time at which the change occurred, and an indication of whether the event corresponded to an increase (e.g., positive) or decrease (e.g., negative) in brightness.

Although the nature of event capture inherently reduces the volume of data generated by an event camera, there are applications in which extraneous data capture by the event camera can be problematic. For example, event data related to a subject in a scene can be hard to distinguish from event data related to the background of the scene when both the background and the subject are in motion and are reflecting light. As an example, a small boat located in rough waters, where both the boat and the rolling water are in motion, reflecting light and are generating events.

The technologies described herein can reduce background clutter or noise in event data by blocking or filtering the output of events that exhibit unique characteristics that associate the events with extraneous data. For example, events generated by pixels corresponding to the motion of a subject in a scene can exhibit different temporal characteristics from events generated by pixels corresponding to the scene background. As an illustration, slowly rolling ocean waves can cause event camera pixels to be illuminated and then darkened at a relatively slow rate as compared to a low-flying airplane, whose propellers and motion cause the event camera pixels to be illuminated and then darkened at a faster rate. In such a case, the event camera pixels corresponding to the airplane (or its activity) can be identified as those that are oscillating more quickly. The present technologies can monitor the rate at which a pixel in an event camera oscillates between generating positive (increase in brightness) and negative (decrease in brightness) events and allows output of events that correspond to an event transition frequency.

To further describe the present technologies, examples are now provided with reference to the figures. FIG. 1 is a diagram illustrating an example event filter device 100 for an event camera. The event camera can include an array of pixels configured to independently detect a change in brightness and generate an event that indicates the polarity change in brightness. The event filter device 100 can monitor the rate at which events generated by a pixel in the pixel array transition between polarities positive to negative brightness, and negative to positive brightness) and allow output of those events that correspond to an event transition frequency, which may be defined as a number of event sign transitions that occur within a time window. Thus, the event filter device 100 can filter events generated by a pixel oscillating above, at, or below a defined event transition frequency, such that the event filter device 100 can be configured via the event transition frequency to be a high-pass, band-pass, or low-pass event filter. Furthermore, the event filter device 100 can be instantiated in the hardware of an event camera, per pixel, to perform event filtering in parallel close to the event source (the pixel) to reduce the output data volume, as well as the associated power consumption and downstream data processing requirements of a system utilizing the event filter device 100. Indeed, each pixel in the event camera can be associated with and assigned to (communicatively coupled to) a respective event filter device, similar to the event filter device 100, as part of a system for pixel frequency filtering. In one example, the filter device 100 can be collocated with a respective pixel(s) and fabricated as part of the event camera's ROIC (readout integrated circuit). Furthermore, one input pixel filter can be used to gate multiple other pixels which themselves provide input to a number of other pixel filters (e.g., a small number of filters can be used to filter a large number of pixels).

FIG. 1 illustrates one possible implementation of the event filter device 100. The event filter device 100 can include input terminals 110A-B for receiving (+) positive and (−) negative events generated by a pixel in an event camera. Positive events indicate an increase in brightness detected by the pixel. Negative events indicate a decrease in brightness detected by the pixel. The pixel oscillates between detecting increases in brightness and detecting decreases in brightness. For example, in the course of a nominal pixel oscillation, a series of positive events are generated by the pixel as light detected by the pixel increases. After detecting a peak in brightness, the pixel generates a series of negative events as light detected by the pixel decreases. This cycle repeats as light detected by the pixel changes in intensity.

The event filter device 100 can include a peak detector 102 configured to detect event sign transitions. Positive and negative events generated by a pixel are sent from the input terminals 110A-B to the peak detector 102, and the peak detector 102 evaluates the events to determine whether an event sign transition has occurred. An event sign transition is a transition from receiving positive events from a pixel to receiving negative events from the pixel, or a transition from receiving negative events from the pixel to receiving positive events from the pixel. In response to detecting an event sign transition, the peak detector 102 generates an electromagnetic signal. The signal generated by the peak detector 102 can occur at half the period of the pixel oscillation. The flip-flops and logic gates that comprise the peak detector 102 in FIG. 1 illustrate one example implementation for evaluating events and detecting an event sign transition. However, as will be appreciated by those skilled in the art, the configuration of the peak detector 102 shown in FIG. 1 is merely one example configuration for detecting an event sign transition and is not meant to be limiting in any way.

The event filter device 100 can include a counter 108 configured to count a number of event sign transitions (i.e., a count of positive-to-negative and negative-to-positive transitions) that occur within a defined time window. In one example, the counter 108 can be a two-bit saturating counter, though other types of counters can be used. Signals generated by the peak detector 102 representing event sign transitions can be sent to the counter 108. The event filter device 100 can include an F input terminal 116 used to transmit a clock (e.g., a square-wave input signal) whose period can be adjusted to correspond to a desired event transition frequency. Between the rising edges of the clock, the counter 108 tallies the number of signals output by the peak detector 102 that indicate event sign transitions, and the counter 108 can be reset on the next rising edge of the clock. Illustratively, at the end of a current clock period, if less than two event sign transitions have occurred, then pixel oscillation is occurring at less than the event transition frequency. If more than two event sign transitions have occurred, then pixel oscillation is occurring above the event transition frequency. If exactly two event sign transitions have occurred at the end of the current clock period, then pixel oscillation is occurring within 1× and 1.5× of the event transition frequency.

The event filter device 100 can include a gate G 118 and an event gate 104. The output of the counter 108 can drive the gate G 118, which can be configured to implement a low-pass, high-pass, or band-pass event filter. In one example, the gate 118 can be configured during manufacturing to implement one of a low-pass, high-pass, or band-pass event filter. In another example, the gate 118 can be configured at runtime, such that the event filter device 100 can be changed from one event filter type to another event filter type. The output of gate G 118 can toggle or switch the event gate 104 open to allow output of events that correspond to the event transition frequency, and the event gate 104 permits subsequent events to flow from the input terminals 110A-B to output terminals 112A-B as long as the event gate 104 remains open. Otherwise the event gate 104 is closed to block events that do not correspond to the event transition frequency.

In one example, delay equalization 106 can be implemented in the event filter device 100 to delay events received from the input terminals 110A-B so that the events are well-aligned with the opening and closing of the event gate 104. The delay equalization 106 can be implemented using buffers, inverters, and the like, which are represented by the triangles shown in FIG. 1.

Figure 2:
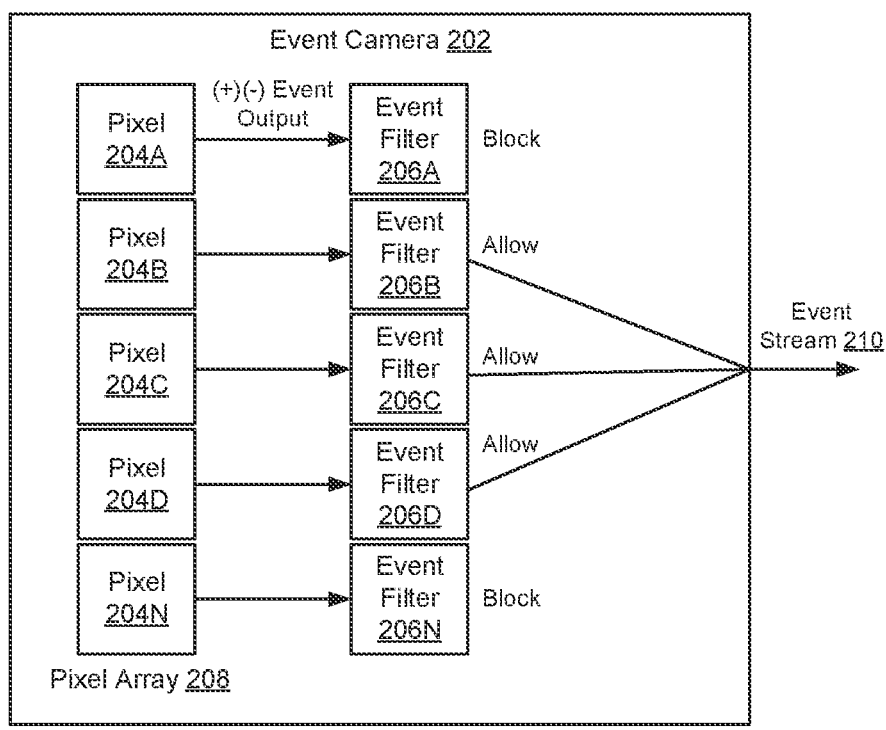
FIG. 2 is a block diagram that illustrates an event camera that includes an event filter for each pixel in a pixel array, in accordance with an example of the technology.

An event filter device, such as the event filter device 100, can be communicatively coupled (via a direct or indirect connection) to a respective pixel in an event camera in order to allow output of events from the event camera that correspond to an event transition frequency, and to block output of other events. For example, as shown in FIG. 2, a system for pixel frequency filtering can comprise an event camera 202 having a pixel array 208 and a plurality of event filter devices 206A-N (N representing any number of event filters that are present within the system for pixel frequency filtering), wherein each pixel 204A-N (N representing any number of pixels that are present in the pixel array of the system for pixel frequency filtering) in the pixel array 208 can be coupled to a respective one of the event filters or event filter devices 206A-N. An event filter 206A-N coupled to a respective pixel 204A-N can individually and asynchronously filter events (allow and block events) generated by one or more of the pixels 204A-N as described above. The event camera 202 outputs an asynchronous event stream 210 triggered by changes in scene illumination individually and independently detected by the pixels 204A-N in the pixel array 208 (e.g., a serial stream of asynchronous events), and the event stream 210 contains those events allowed by the event filters 206A-N.

Referring again to FIG. 1, the event filter device 100, in one example, can be configured to perform center surround stimulation (CSS) to mitigate latency associated with opening the event gate 104 to allow output of events generated by a pixel. For example, in the case where light reflected from a subject in a scene rapidly transits the event camera sensor (array of pixels), the light may transit from a first pixel to a second pixel before an event gate 104 of an event filter device 100 coupled to the first pixel can open to allow an event to be output from the first pixel. CSS can be used to address this problem by communicating event activity with surrounding event filter devices 100. In one example, an event filter device 100 coupled to a pixel communicates event activity to one or more nearby event filter devices coupled to one or more nearest neighborhood pixels so that the event filter devices associated with those pixels can open their respective event gates 104 prior to the pixels detecting the light. The event filter device 100 can include an input CSS terminal 114A to receive an indication of event activity from one or more adjacent event filter devices, and a CSS output terminal 114B to send an indication of event activity to one or more adjacent event filter devices. The size of the neighborhood of pixels (e.g., radius of the region surrounding each pixel connected via event filter devices 100) is determined by the maximum anticipated rate of a subject transiting across the event camera sensor. The size of the neighborhood of pixels can be hardwired or can be programmable at runtime.

Figure 3A:
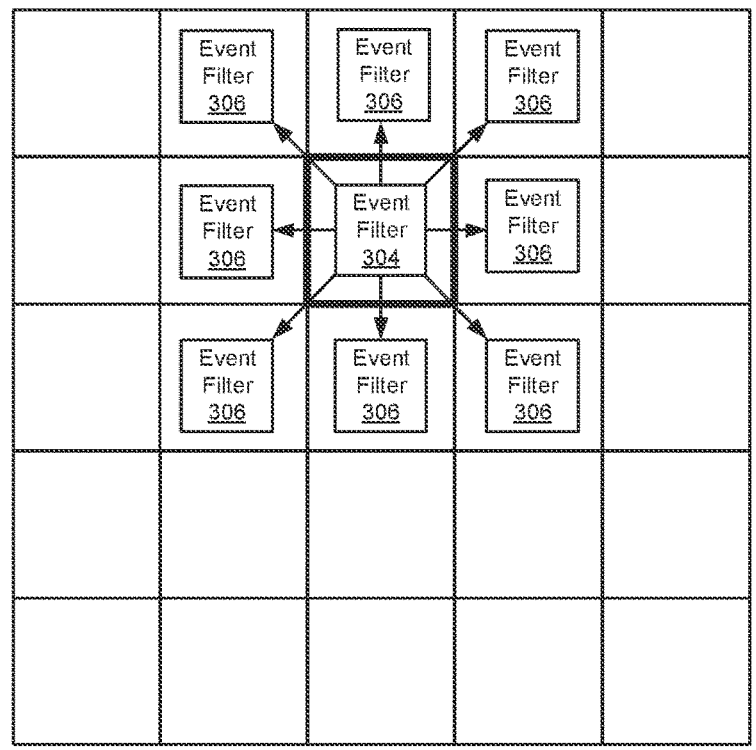
FIGS. 3A-B are diagrams illustrating center surround stimulation used to mitigate latency associated with opening an event gate, in accordance with an example of the technology.

In response to receiving an indication of event activity via the input CSS terminal 114A, an event filter device 100 can open its event gate 104 prior to receiving events via the input terminals 110A-B to allow the events to flow out the event filter device 100 via the output terminals 112A-B. As an illustration, and with continued reference to FIG. 1, FIGS. 3A-B demonstrate how CSS can be performed to preemptively allow output of events that correspond to an event transition frequency as light traverses pixels in a pixel array 302. Each pixel in the pixel array 302 can be associated with and assigned to an individual event filter device similar to event filter device 100 configured to perform CSS (e.g., see event filter devices 306 associated with and assigned to respective pixels in the pixel array 302). As shown in FIG. 3A, in response to determining that events generated by a given pixel (in this example the pixel shown in bold line) in the pixel array 302 correspond to a defined event transition frequency, an event filter 304 assigned to and associated with the given pixel sends an indication (e.g., a signal transmitted via a CSS output terminal 114B) to neighboring event filters, which may include event filters coupled to pixels that are adjacent to the pixel (shown in bold line) that generated the events (e.g., event filter devices 306).

In response to receiving the indication of event activity (e.g., a signal received via a CSS input terminal 114B) from the event filter 304, neighboring event filters 306 that are associated with and assigned to (i.e., communicatively coupled to) respective pixels that are adjacent to the given pixel, may open their respective event gates (similar to event gate 104 of event filter 100) in anticipation of receiving events from the pixels that correspond to the defined event transition frequency. In the case that the light traversing the pixel array 302 lands on a pixel communicatively coupled to a neighboring event filter 306, the event gate of the neighboring event filter 306 will already be open and events generated by the pixel will flow through the event filter 306 and be output via the output terminals (similar to the output terminals 112A-B of event filter 100) of the neighboring event filter 306.

Figure 3B:
Figure 3B:
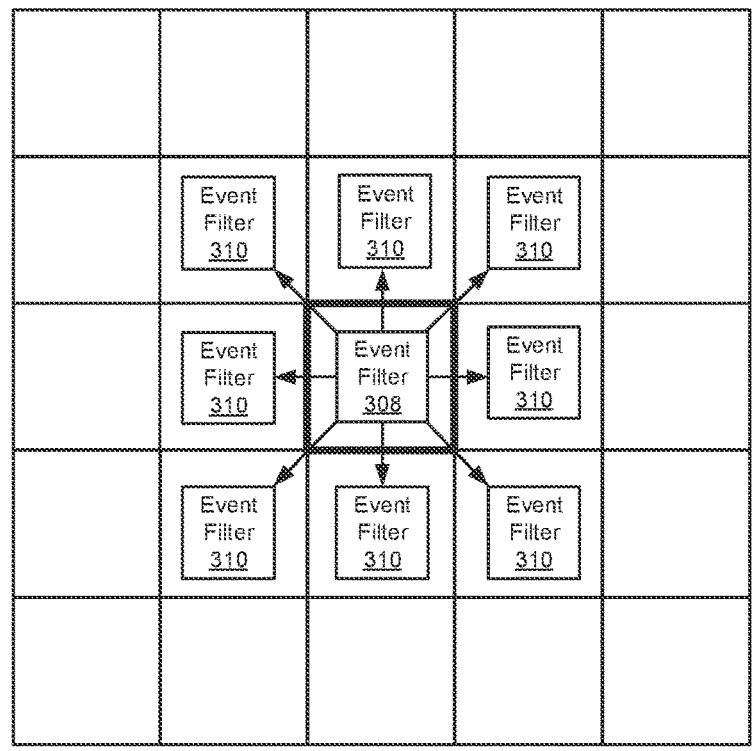

FIG. 3B illustrates that as the light traverses the pixels in the pixel array 302, CSS can be continued to be performed to preemptively allow output of events that correspond to the event transition frequency. For example, the light traversing the pixel array 302 may next land on a given pixel (shown in bold line) communicatively coupled to an event filter 308 that has an open event gate (similar to event gate 104 of event filter 100), wherein the event gate has been preemptively opened in response to receiving the CSS communication from the event filter 304, as described above. Because the event gate has been preemptively opened, events generated by the pixel are initially allowed to be output from the event filter 308 during a time that the event filter 308 evaluates the events to determine whether the events correspond to the defined event transition frequency. In the case that the events generated by the pixel (shown in bold line) do correspond to the defined event transition frequency, the event filter 308 may send an indication of the event activity to neighboring event filters 310 to allow the neighboring event filters 310 to preemptively open their respective event gates (similar to event gates 104 of event filter 100) in anticipation of receiving output events that correspond to the defined event transition frequency.

While the preceding discussion and figures illustrate example configurations that may implement the techniques above, many other similar or different configurations are possible. Those skilled in the art will recognize that the example configurations discussed and illustrated above are merely representative and not limiting. Further, although the various processes and/or other functionality contained within the event filter device 100 has been described as being implemented in hardware, the processes and functionality may also be implemented as instructions executed on one or more processors that are in communication with one or more memory modules.

Figure 4A:
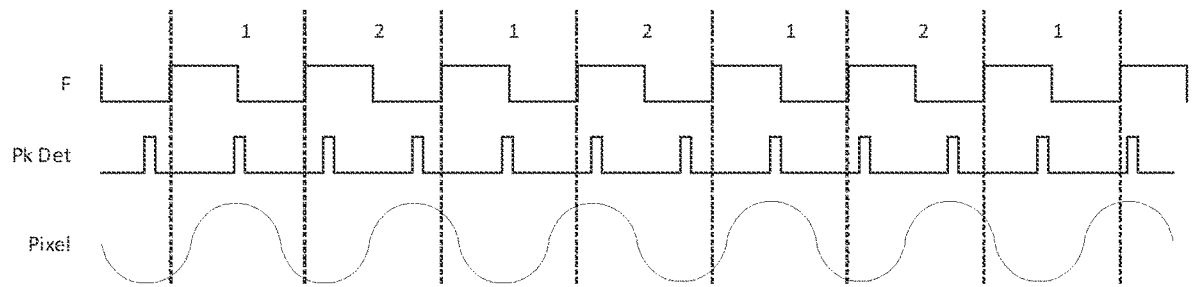
FIGS. 4A-B are diagrams that illustrate the use hysteresis to mitigate poor performance related to event gate oscillation, in accordance with an example of the technology.

Referring now to FIG. 4, an event filter device can be configured to use hysteresis to mitigate poor performance related to event gate oscillation. In cases where an event sign transition regularly occurs near, or at, a rising edge of a clock, the number of event sign transitions counted during a time window may fluctuate causing an event gate in an event filter device to oscillate between open and closed states. For example, FIG. 4A illustrates a supposed case where detected peaks (Pk Det) of event sign transitions (Pixel) counted within time windows defined by a rising edge of a clock (F) oscillates between 1 and 2. The oscillation between the detected peak counts cause the event gate to fluctuate between open and closed, resulting in poor performance of the event filter device.

Hysteresis can be implemented in the event filter device to mitigate the event gate oscillation described above. In one example, an additional state can be added to the system, and the additional state can be evaluated before the event gate is opened to allow output of events. In one example, the additional state can be added to the system by including an additional flip-flop circuit or latching gate in the event filter. The additional flip-flop can be used to record event sign transitions that occur at the edge of a time window, and the event filter device can evaluate the state of the additional flip-flop to determine whether to open or close the event gate.

Figure 4B:
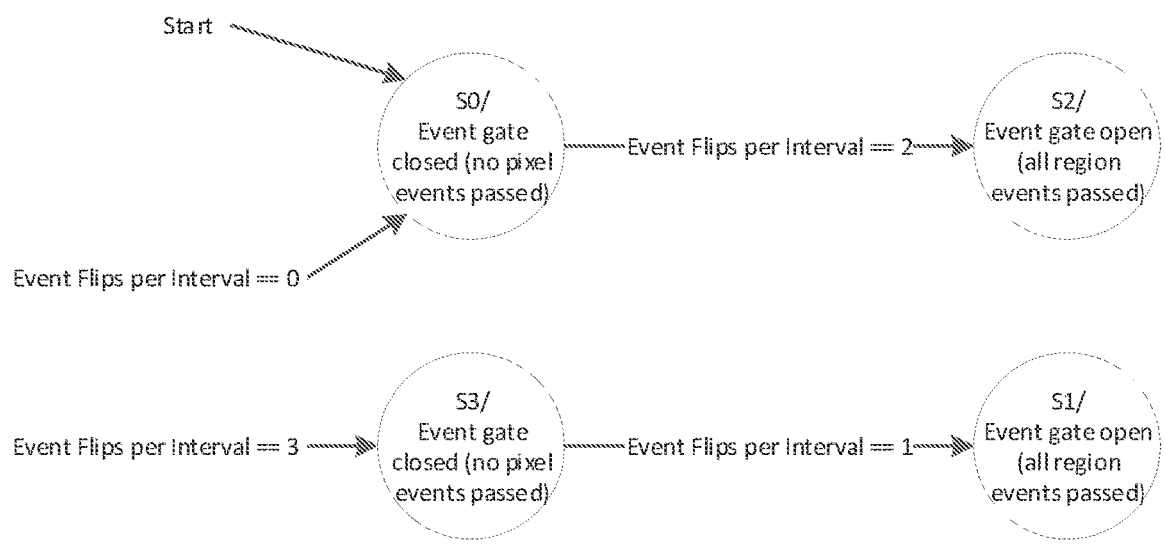

As one example, the state diagram in FIG. 4B illustrates a state diagram for a bandpass implementation with hysteresis. In this case, a two-bit counter can be used, but another flip-flop can be included to implement the state machine. As shown, the event gate closes when there are zero (0) or >=three (3) peak counts. If the event gate last closed because there were zero (0) counts, the event gate will not open again until there are two (2) counts; but if the event gate last closed because there were >=three (3) counts, the event gate will not open again until there is one (1) count. Forcing a change of two (2) (i.e., either zero-to-two or three-to-one) provides hysteresis that prevents the event gate from oscillating at certain peak rates, for example, as shown in FIG. 4A, where the detected peak count oscillates between one (1) and two (2). As can be appreciated, hysteresis can be used for low-pass and high-pass event filter implementations as well.

Figure 5:
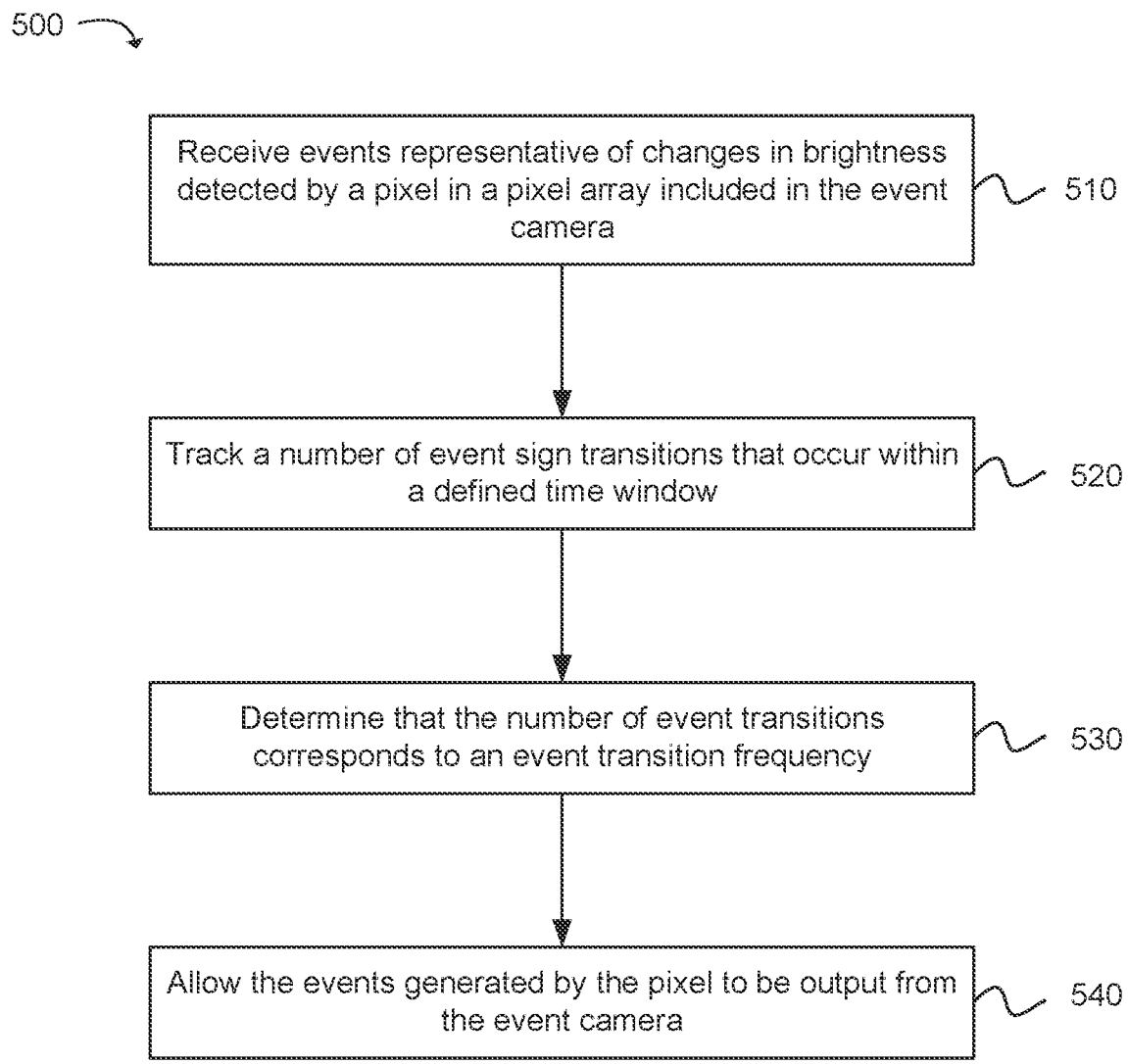
FIG. 5 is a flow diagram illustrating an example method for pixel frequency filtering for an event camera, in accordance with an example of the technology.

The above-discussed example system for pixel frequency filtering comprising the event camera and event filter devices can facilitate a corresponding method for pixel frequency filtering for the event camera. Indeed, FIG. 5 is a flow diagram illustrating one example method 500 for pixel frequency filtering for an event camera, where the event camera comprises or otherwise utilizes various event filter devices, such as event filter device 100 described above. As such, the method described herein can be carried out with an event camera having various event filter devices, such as the event camera and event filter devices described herein with respect to FIGS. 1-4. Therefore, the above discussion with respect to FIGS. 1-4 can be referred to for further discussion on the various steps set forth in the below method 500.

As in block 510, the method 500 can include receiving events representative of changes in brightness detected by a pixel in a pixel array included in an event camera. Each pixel of the pixel array can be configured to independently detect a change in brightness and output an indication of the change in brightness as one of: a positive event indicating an increase in brightness detected by the pixel, or a negative event indicating a decrease in brightness detected by the pixel.

As in block 520, the method 500 can include tracking a number of event sign transitions that occur within a defined time window. An event sign transition may be a transition from receiving positive events to receiving negative events, or may be a transition from receiving negative events to receiving positive events. In one example, the event transition frequency and/or the defined time window can be set to implement a low-pass filter, a high-pass filter, or a band-pass filter. For example, the length of the time window can be defined, and the event transition frequency can be set to a number of event transitions that are allowed during the defined time window.

In one example, determining that the number of event transitions corresponds to an event transition frequency can include using hysteresis to mitigate performance issues associated with event sign transition that occur at a rising edge of a clock. For example, the method 500 can include adding an additional state to the system and evaluating the additional state to determine whether a number of event transitions that have occurred allows events to be output from an event filter.

As in block 530, in the case that the number of event transitions corresponds to an event transition frequency (e.g., that implements a low-pass, high-pass, or band-pass event filter), the method 500 can allow the events generated by the pixel to be output from the event camera, as in block 540. For example, the events can be output from an event camera as an event stream, which can be provided to downstream processing modules.

In one example, the method 500 can perform center surround stimulation (CSS) to mitigate latency associated with opening an event gate to allow output of events generated by a pixel. Performing CSS can include sending an indication of events allowed to be output to a neighboring event filter to cause the neighboring event filter to open an associated event gate (i.e., its event gate) to allow output of events in anticipation that a pixel coupled to the neighboring event filter will detect a change in brightness that corresponds to the defined event transition frequency.

Figure 6:
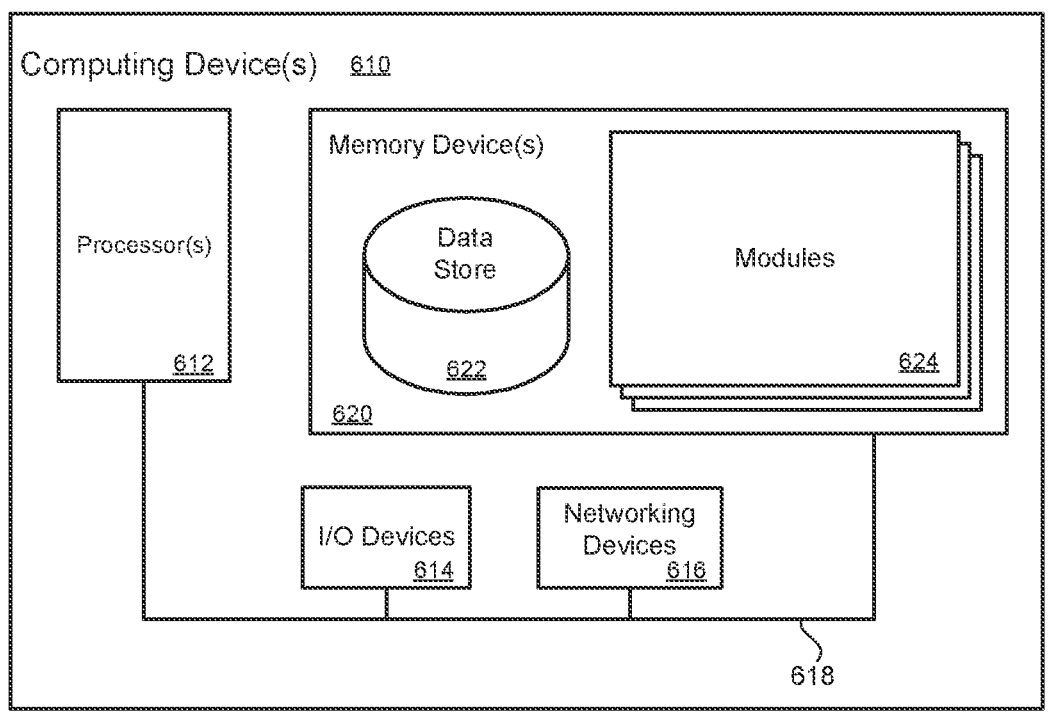
FIG. 6 is a block diagram illustrating an example of a computing device that may be used to execute the methods described herein.

FIG. 6 illustrates a computing device 610 on which modules implementing methods of this technology can execute. The computing device 610 illustrated is a high-level example of a device on which the present technology can be executed. The computing device 610 can include one or more processors 612 that are in communication with one or more memory devices 620. In one example, the computing device 610 can be a field-programmable gate array (FPGA) which is programmed to execute the methods described herein. The computing device 610 can include a local communication interface 618 for the components in the computing device 610. For example, the local communication interface 618 can be a local data bus and/or any related address or control busses as may be desired.

The memory device 620 can contain modules 624 that are executable by the processor(s) 612 and data for the modules 624. In one example, the memory device 620 can include an event module, demodulator modules, identity module, and other modules. In one example, one or more modules can be executed in parallel to enable simultaneous demodulation of multiple, individual, communication streams. The modules 624 can execute the functions described earlier. A data store 622 can also be located in the memory device 620 for storing data related to the modules 624 and other applications along with an operating system that is executable by the processor(s) 612.

Other applications can also be stored in the memory device 620 and may be executable by the processor(s) 612. Components or modules discussed in this description that can be implemented in the form of software using high-level programming languages that are compiled, interpreted, or executed using a hybrid of the methods described herein.

In some examples, the computing device 610 can have access to I/O (input/output) devices 614 that are usable by the computing device 610 to communicate with other computing devices (e.g., for performing CSS). Networking devices 616 and similar communication devices can be included in the computing device 610. The networking devices 616 can be wired or wireless networking devices, as will be appreciated.

The components or modules that are shown as being stored in the memory device 620 can be executed by the processor(s) 612. The term "executable" can mean a program file that is in a form that can be executed by a processor 612. For example, a program in a higher level language can be compiled into machine code in a format that can be loaded into a random access portion of the memory device 620 and executed by the processor 612, or source code can be loaded by another executable program and interpreted to generate instructions in a random access portion of the memory to be executed by a processor. The executable program can be stored in any portion or component of the memory device 620. For example, the memory device 620 can be random access memory (RAM), read only memory (ROM), flash memory, a solid state drive, memory card, a hard drive, or any other type of memory component.

The processor 612 can represent multiple processors and the memory device 620 can represent multiple memory units that operate in parallel to the processing circuits. This can provide parallel processing channels for the processes and data in the system. The local communication interface 618 can be used as a network to facilitate communication between any of the multiple processors and multiple memories. The local communication interface 618 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared, and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An event filter device for an event camera, comprising:
a processor and memory configured to:
receive events representative of changes in brightness detected by a pixel in a pixel array of the event camera, wherein each pixel of the pixel array is configured to independently detect a change in brightness and output an indication of the change in brightness as one of a positive event indicating an increase in brightness detected by the pixel, or a negative event indicating a decrease in brightness detected by the pixel;
count a number of event sign transitions that occur within a defined time window, wherein an event sign transition is a transition from receiving positive events to receiving negative events, or a transition from receiving negative events to receiving positive events;
determine that the number of event transitions that occurred within the defined time window correspond to an event transition frequency comprising the rate at which events generated by a pixel in the pixel array transition between polarities; and
output the events generated by the pixel.

2. The event filter device in claim 1, further comprising a processor clock having a clock rate that defines the defined time window, wherein a rising edge of the clock rate begins the defined time window and a next rising edge of the clock rate resets the defined time window.

3. The event filter device in claim 1, further comprising a two-bit saturating counter configured to count the number of event sign transitions within the defined time window.

4. The event filter device in claim 1, wherein the event transition frequency is set to implement at least one of a low-pass filter, a high-pass filter, or a band-pass filter.

5. The event filter device in claim 1, wherein the event filter device is operable with a plurality of additional event filter devices, wherein each event filter device is communicatively coupled to a respective pixel in the pixel array of the event camera, wherein each event filter device operates to filter events generated by its respective associated pixel.

6. The event filter device in claim 5, wherein each event filter device is further configured to send an indication of an event allowed to be output from the event filter device to a neighboring event filter device to cause the neighboring event filter device to open an event gate allowing output of events generated by a pixel communicatively coupled to the neighboring event filter.

7. The event filter device in claim 1, wherein the processor and memory are further configured to, using hysteresis, determine that the number of event transitions corresponds to the event transition frequency.

8. A system for pixel frequency filtering, comprising:
an event camera having a pixel array comprising a plurality of pixels, each pixel of the pixel array being configured to independently detect a change in brightness and output an indication of the change in brightness as an event;
an event filter associated with one of the pixels in the pixel array, the event filter having a processor and memory configured to:
receive events generated by the associated pixel in the pixel array, wherein the events include positive events indicating an increase in brightness detected by the pixel, and negative events indicating a decrease in brightness detected by the pixel;
count a number of event sign transitions that occur within a defined time window, wherein an event sign transition is a transition from receiving positive events to receiving negative events, or a transition from receiving negative events to receiving positive events;
determine that the number of event transitions corresponds to an event transition frequency comprising the rate at which events generated by a pixel in the pixel array transition between polarities; and
output the events received from the pixel.

9. The system in claim 8, wherein the defined time window is a clock rate of a clock generator of the processor.

10. The system in claim 8, further comprising a two-bit saturating counter configured to count the number of event sign transitions within the defined time window.

11. The system in claim 8, wherein the event filter is further configured to receive an event transition frequency setting to implement at least one of a low-pass filter, a high-pass filter, or a band-pass filter.

12. The system in claim 8, further comprising a plurality of event filters, wherein each event filter of the plurality of event filters is communicatively coupled to a respective pixel in the pixel array of the event camera in order to filter events generated by the respective pixel.

13. The system in claim 8, wherein each event filter is further configured to send an indication of an event allowed to be output from the event filter to a neighboring event filter to cause the neighboring event filter to preemptively allow output of events detected by a pixel coupled to the neighboring event filter.

14. The system in claim 8, further comprising a flip-flop circuit to store count state information used to implement hysteresis for preventing gate oscillation when event sign transitions occur at certain rates.

15. A method for pixel frequency filtering for an event camera, comprising:
receiving events representative of changes in brightness detected by a pixel in a pixel array included in the event camera,
wherein each pixel of the pixel array is configured to independently detect a change in brightness and output an indication of the change in brightness as one of a positive event indicating an increase in brightness detected by the pixel, or a negative event indicating a decrease in brightness detected by the pixel;
tracking a number of event sign transitions that occur within a defined time window, wherein an event sign transition is a transition from receiving positive events to receiving negative events, or a transition from receiving negative events to receiving positive events;
determining that the number of event transitions corresponds to an event transition frequency comprising the rate at which events generated by a pixel in the pixel array transition between polarities; and
allowing the events generated by the pixel to be output from the event camera.

16. The method in claim 15, further comprising setting the event transition frequency to implement a low-pass filter.

17. The method in claim 15, further comprising setting the event transition frequency to implement a high-pass filter.

18. The method in claim 15, further comprising setting the event transition frequency to implement a band-pass filter.

19. The method in claim 15, further comprising sending an indication of the events allowed to be output to a neighboring event filter to cause the neighboring event filter to open an associated event gate to allow output of events in anticipation that a pixel coupled to the neighboring event filter will detect a change in brightness that corresponds to the event transition frequency.

20. The method in claim 15, further comprising performing hysteresis to determine that the number of event transitions correspond to the event transition frequency.

* * * * *